May 5, 1964  H. O. SCHERENBERG ETAL  3,131,945
ROTARY PISTON ENGINE CONSTRUCTION
Filed Feb. 13, 1962
FIG. 1
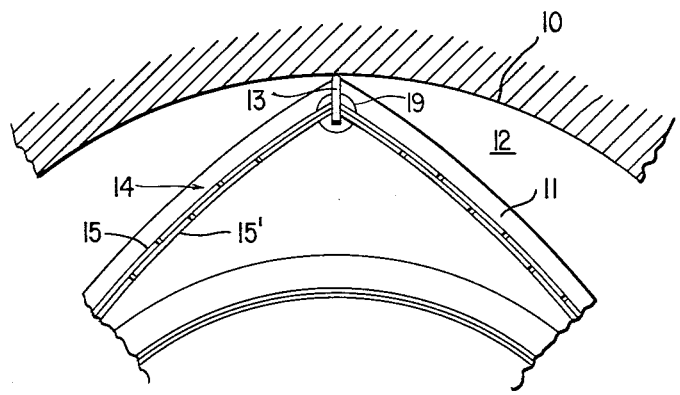
FIG. 2
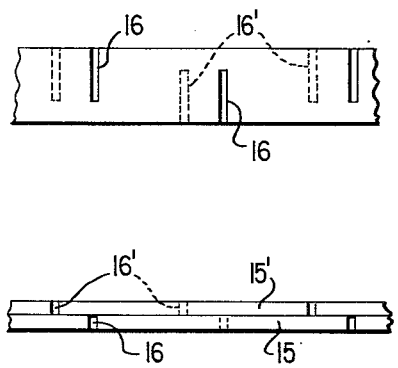
FIG. 3
FIG. 4
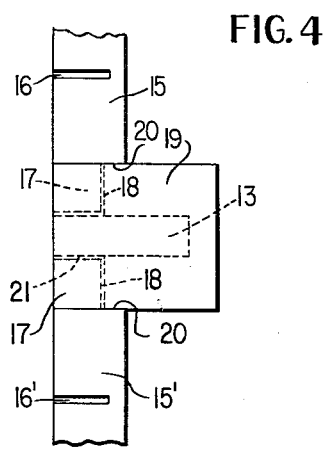
INVENTORS.
HANS O. SCHERENBERG
JOHANNES GASSMANN
BY
Dicke and Craig
ATTORNEYS.

United States Patent Office 3,131,945
Patented May 5, 1964

3,131,945
ROTARY PISTON ENGINE CONSTRUCTION
Hans O. Scherenberg, Stuttgart-Heumaden, and Johannes Gassmann, Altbach (Neckar), Germany, assignors to Daimler-Benz Aktiengesellschaft, Stuttgart-Unterturkheim, Germany
Filed Feb. 13, 1962, Ser. No. 173,034
Claims priority, application Germany Feb. 25, 1961
4 Claims. (Cl. 277—215)

The present invention relates to the construction of sealing strip ledge members for rotary piston engines, especially for the axially disposed rotor end faces thereof.

It is desirable with rotary piston engines, especially for the end faces of the rotors, to install the sealing ledge members or sealing strips without play. This, however, becomes problematical with the compact sealing strips or ledge members known heretofore by reason of the thermal expansion occurring during operation and leads either to excessively close fits and excessively small tolerances or leads eventually to play notwithstanding such other precautions. Above all, the adaptation becomes practically impossible with changing operating conditions.

The present invention aims at a sealing strip ledge member in which the aforementioned considerations are properly and effectively taken into account. The present invention thereby solves the underlying problem by providing a sealing strip ledge member construction in which each sealing ledge member consists of at least two flat strips or bands abutting against one another, whereby each strip is provided with cut-out portions alternately extending from each small side thereof and the cut-out portions of the two strips are mutually displaced or staggered in the longitudinal direction of the strip.

It is possible by such a construction for each strip and therewith also for each ledge member as a whole to expand within itself without requiring any consideration for such expansion already during installation by corresponding close and minute tolerances. The sealing ledge member in accordance with the present invention adapts itself automatically to changing operating conditions. The displacement of the cut-out portions thereby assures the gas-tightness of the sealing ledge assembly. In general, the sealing ledge member in accordance with the present invention consists only of two strips. However, it is understood of course that the principle of the present invention is also applicable to sealing ledge assemblies having more than two strips as well as to sealing strip ledge assemblies along the circumference of the rotor or also to other sealing ledge assemblies.

According to the present invention, the sealing ledge strips or bands are provided at the ends thereof with an offset or stepped portion of approximately half the width of the strip or band and are supported by means of the end surfaces remaining above these stepped or offset portions against the transition bolts arranged at the impact or abutment places, i.e., at those places where the sealing ledges 14 meet one another in the corners of the rotor 11. Such an arrangement entails the advantage that the expansion forces are supported at the transition bolt or bolts whereas the sealing ledge members need not absorb these forces along the circumference of the rotor and therefore need not transmit these forces to the cam track or engaging surfaces.

Accordingly, it is an object of the present invention to provide a seal construction for rotary piston devices, especially for the axially disposed end faces thereof, which eliminates by simple means the disadvantages and shortcomings encountered with the prior art devices.

It is another object of the present invention to provide a sealing construction which is simple and inexpensive in both manufacture and installation, yet is capable of assuring a completely satisfactory seal under all operating conditions.

A further object of the present invention resides in the provision of a sealing ledge construction substantially free of any play and consisting of at least two strips or bands which automatically adapts itself to different operating conditions without requiring excessively close fits and tolerances during installation thereof.

Still another object of the present invention resides in the provision of a sealing strip assembly for rotary piston devices, especially for rotary piston internal combustion engines, which is capable of undergoing thermal expansion without, however, transmitting the resulting expansion forces to adjoining parts.

These and other objects, features and advantages of the present invention will become more obvious from the following description when taken in connection with the accompanying drawing which shows, for purposes of illustration only, one embodiment in accordance with the present invention, and wherein FIGURE 1 is a partial elevational view of a rotary piston engine provided with a sealing ledge assembly in accordance with the present invention;

FIGURE 2 is a partial side elevational view, on an enlarged scale, of the sealing ledge construction in accordance with the present invention;

FIGURE 3 is a partial top plan view of the sealing ledge construction of FIGURE 2, and FIGURE 4 is a somewhat schematic partial view, on an enlarged scale, illustrating the impact place at the transition bolt for a sealing ledge construction in accordance with the present invention.

Referring now to the drawing wherein like reference numerals are used throughout the various views to designate like parts, and more particularly to FIGURE 1, reference numeral 11 designates therein a rotor rotatably arranged, in a manner known per se, within the housing 10 of a rotary piston engine. The sealing of the combustion spaces 12 is realized by means of sealing ledge members 13 which are arranged at the circumference of the rotor 11 at the corners thereof and which sealingly abut against the internal cam track or engaging surfaces of the housing 10. Additionally, sealing ledge members generally designated by reference numeral 14 are arranged at the end faces, i.e., at the axially disposed end faces of the rotor 11.

Each of the last-mentioned sealing ledge members 14 consists of two bands or strips 15 and 15' which abut tightly against one another. Both strips 15 and 15' are similar to each other as such and are provided, as shown in FIGURES 2 and 3, with narrow cut-out portions or kerfs 16 and 16' extending inwardly alternately from both oppositely disposed small sides thereof; however, the cut-out portions 16 and 16' extend through the entire thickness of a respective strip or band. These cut-out portions or kerfs 16 and 16' extend inwardly into the strips or bands 15 and 15' beyond half the width thereof. As may be readily seen in particular from FIGURE 3, the cut-out portions are mutually displaced in the longitudinal direction of the strips so that the sealing ledge assembly 14 consisting of the two tightly abutting strips 15 and 15' is operative as a whole in a gas-tight manner.

The two bands or strips 15 and 15' are provided at both ends thereof, as shown in FIGURE 4, with offset or stepped portions 17 which correspond approximately to one-half the width of a strip or band. The off-set portions 17 extend into corresponding apertures 18 of the transition bolt 19. A transition bolt 19 is arranged at each impact or abutment place of the sealing ledge assembly 14 and simultaneously therewith accommodates also the sealing ledge member 13.

The offset or stepped portions 17 are so dimensioned in their length that the expansion in length thereof is not transmitted to the transition bolt 19 by the offset portions 17 but instead by the end surfaces 20. There remains thereby between the offset portions 17 and the sealing ledge member 13 an extremely small play 21 determined beforehand by the manufacture with extremely close fit which play 21 does not change during operation. Consequently, the sealing ledge members 13 arranged at the circumference of the rotor 11 need not absorb the expansion forces occurring in the bands or strips 15 and 15'.

While we have shown and described one embodiment in accordance with the present invention, it is understood that the same is not limited thereto, but is susceptible of many changes and modifications within the spirit and scope thereof, and we therefore do not wish to be limited to the details shown and described therein, but intend to cover all such changes and modifications as are encompassed by the scope of the appended claims.

We claim:

1. A seal construction for rotary piston engines, especially for the axially disposed end faces of the rotor, comprising sealing ledge means having at least two strips in flat abutment with each other, each strip being provided with cut-out portions extending inwardly alternately from each small side thereof, and the cut-out portions on one side of said strips being displaced in the longitudinal direction of the strips, and transition bolt means between adjacent ends of said sealing means, each of said sealing strips being provided at the ends thereof with a stepped portion approximately of half the strip-width and being supported at a corresponding bolt means by the end surface remaining above the respective stepped portion.

2. A seal construction for rotary piston engines, comprising sealing means having at least two strips in flat abutment with each other, each strip being provided with cut-out portions extending inwardly from each small side thereof, the depth of said cut-out portions being greater than half the strip-width, and the cut-out portions on one side of said strips being displaced in the longitudinal direction of the strips, and transition bolt means between adjacent ends of said sealing means, each of said sealing strips being provided at the ends thereof with a stepped portion approximately of half the strip-width and being supported at a corresponding bolt means by the end surface remaining above the respective stepped portion.

3. A seal construction for rotary piston engines, comprising sealing means having at least two strips in flat abutment with each other, all of the sealing strips having substantially the same thickness, each strip being provided with cut-out portions extending inwardly from each small side thereof, and the cut-out portions on one side of said strips being displaced in the longitudinal direction of the strips, and transition bolt means between adjacent ends of said sealing means, each of said sealing strips being provided at the ends thereof with a stepped portion approximately of half the strip-width and being supported at a corresponding bolt means by the end surface remaining above the respective stepped portion.

4. A seal construction for rotary piston engines, especially for the axially disposed end faces of the rotor, comprising sealing ledge means having at least two strips in flat abutment with each other, all of the sealing strips having substantially the same thickness, each strip being provided with cut-out portions extending inwardly alternately from each small side thereof, the depth of said cut-out portions being greater than half the strip-width, and the cut-out portions on one side of said strips being displaced in the longitudinal direction of the strips, and transition bolt means between adjacent ends of said sealing means, each of said sealing strips being provided at the ends thereof with a stepped portion approximately of half the strip-width and being supported at a corresponding bolt means by the end surface remaining above the respective stepped portion.

References Cited in the file of this patent

UNITED STATES PATENTS

| | | |
|---|---|---|
| 1,369,905 | Peters | Mar. 1, 1921 |
| 2,729,525 | Sietman | Jan. 3, 1956 |
| 3,046,069 | Schmidt | July 24, 1962 |
| 3,064,880 | Wankel | Nov. 20, 1962 |

FOREIGN PATENTS

| | | |
|---|---|---|
| 123,352 | Great Britain | Feb. 17, 1919 |
| 864,855 | France | May 7, 1941 |